No. 746,726. PATENTED DEC. 15, 1903.
U. G. MERRILL.
ELECTRICAL SIGNAL SYSTEM.
APPLICATION FILED SEPT. 10, 1902.
NO MODEL.
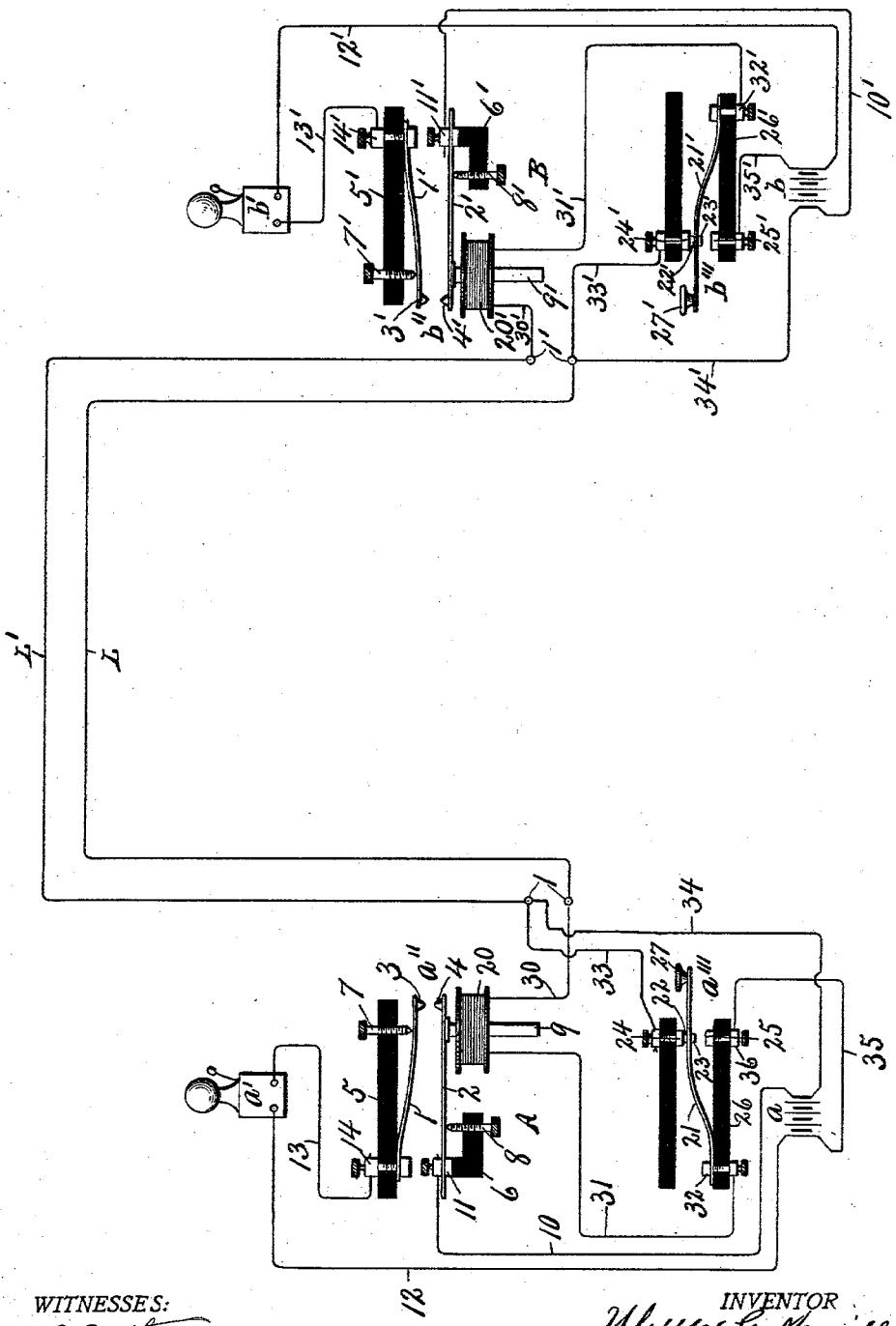
WITNESSES:
INVENTOR
Ulysses G. Merrill
BY
Smith & Druison
ATTORNEYS.

No. 746,726. Patented December 15, 1903.

UNITED STATES PATENT OFFICE.

ULYSSES G. MERRILL, OF LITCHFIELD, MAINE.

ELECTRICAL SIGNAL SYSTEM.

SPECIFICATION forming part of Letters Patent No. 746,726, dated December 15, 1903.

Application filed September 10, 1902. Serial No. 122,867. (No model.)

*To all whom it may concern:*

Be it known that I, ULYSSES G. MERRILL, of Litchfield, in the county of Kennebec, in the State of Maine, have invented new and useful Improvements in Electric Signal Systems, of which the following, taken in connection with the accompanying drawings, is a full, clear, and exact description.

This invention relates to improvements in signaling systems, and refers more particularly to specific means for reducing the number of the batteries necessary to operate electrical devices—such as signals, calls, or similar mechanisms—at stations distant one from the other.

My object, therefore, is to provide each station with a simple and practical means for operating a distant electrical device by means of a small electromotive force—as, for instance, a small battery.

To this end the invention consists in the construction and arrangement of the parts of a signal or call system, as hereinafter fully described, and pointed out in the claim.

In the drawing I have shown a diagrammatic view of an electric system embodying the features of my invention, and for the purpose of clearly demonstrating the utility and simplicity of this device I have shown two distant stations (represented by A and B) connected by main or line wires L and L', the opposite ends of the line-wires being connected to local terminals $l$ and $l'$ at the stations where my invention is employed. Each of these stations is equipped with a local battery $a$ and $b$, signals $a'$ and $b'$, circuit-closers $a''$ and $b''$, and electric switches $a'''$ and $b'''$. The signals $a'$ and $b'$ are connected in local circuits to the batteries $a$ and $b$, respectively, and the circuit-closers $a''$ and $b''$ are connected in their respective local-battery circuits, being connected in said circuits between the battery and bell, the circuit-closer $a''$ consisting of spring-terminals 1 and 2, having suitable contacts 3 and 4, and the circuit-closer $b''$ consists of similar spring-terminals 1' and 2', having contact-pieces 3' and 4'. These spring-terminals 1 and 1' are secured at one end to suitable insulating-supports 5 and 5', and the spring-terminals 2 and 2' are also mounted at one end upon insulating-supports 6 and 6', the contact-pieces 3 and 4 and 3' and 4' of each circuit-closer being secured to the free ends of said spring-terminals and are adapted to contact with each other automatically in the manner hereinafter described.

Each of the insulating-supports 5 and 6 are provided with adjusting-screws 7 and 8, and the corresponding insulating-supports at the other station are provided with similar adjusting-screws 7' and 8', whereby the contact-pieces of the circuit-closers may be suitably adjusted to maintain the contact-pieces in their proper relative positions.

The spring-terminals 2 and 2' of each of the circuit-closers $a''$ and $b''$ are tensioned to move their respective contact-pieces 4 and 4' into contact with their respective terminals 3 and 3' when the circuit through the main line is closed, as hereinafter described, said spring-terminals 2 and 2' being normally held against their own tension for the purpose of holding the contact-pieces of each circuit-closer separated from each other by permanent magnets 9 and 9', which normally attract the spring-terminals when the circuit in the main line is open, thereby holding the contact-pieces of each circuit-closer separated one from the other and preventing the action of the local current through its signal or other electric device which it may be desired to operate by the local source of electric energy, as the battery $a$ and $b$. These local circuits of each station A and B originate from their respective batteries $a$ and $b$, one pole of the battery $a$ being connected by a wire 10 to the terminal 2 through the medium of a binding-post 11, secured to the insulating-block 6. The other pole of the battery $a$ is connected to one terminal of the signal $a'$ by a wire 12, the other terminal of said signal being connected by a wire 13 to the terminal 1 through the medium of the binding-post 14, mounted upon the insulating-piece 5. In like manner one of the poles of the battery $b$ is connected by a wire 10' to the terminal 2' through the medium of the binding-post 11', secured to the insulating-piece 6', and the other pole of the battery $b$ is connected by a wire 12' to one terminal of the electric signal $b'$, the other terminal of said signal being connected by a wire 13' to the terminal 1' of the circuit-closer $b''$ through the medium of a binding-post 14'.

The circuits just described constitute the local electric connection between the battery $a$ and $b$ and their respective signals $a'$ and $b'$, which when the circuit is closed throws comparatively the full energy of the battery through the signal connected thereto, thus giving a strong action to the signal.

As previously stated, the contact-pieces of each circuit-closer $a''$ and $b''$ of the stations A and B are normally open, being held in this position by means of the permanent magnets 9 and 9'.

I will now proceed to describe the means for releasing the terminals 2 and 2'' for permitting the closing of the circuit-closers $a''$ and $b''$. These means consist of electric coils 20 and 20' and the switches $a'''$ and $b'''$, all of which parts are connected in the main-line circuit and supplied with an electric current from any suitable source of electric energy— as, for instance, the batteries $a$ and $b$. The coils 20 and 20' are wound upon suitable spools or bobbins and are mounted concentrically upon the magnetic bars 9 and 9'. The switch $a'''$ usually consists of a spring-arm 21, having opposite contact-pieces 22 and 23, adapted to contact with suitable terminals 24 and 25, one end of this spring-arm 21 being secured to an insulating-piece 26, and its free end is provided with the contact-pieces 22 and 23 and with a handpiece 27, the arm 21 being tensioned to normally contact the projection 22 with the terminal 24 and to separate the contact 23 from the terminal 25, and the handpiece 27 serves as a convenient means for depressing the free end of the arm 21, so as to break the contact with the terminal 24 and to make contact with the terminal 25 when desired. One end of the coil 20 is connected by a wire 30 to one of the binding-posts 1, and the other end of the coil is connected by a wire 31 to the spring-arm 21 through the medium of the binding-post 32. The terminal 24 is connected by a wire 33 to the other binding-post 1, which is also connected by a wire 34 to one pole of the battery $a$, the other pole of said battery being connected by a wire 35 to the terminal 25 through the medium of a binding-post 36. In like manner the switch $b'''$ consists of a spring arm or conductor 21, having contact-pieces 22' and 23', adapted to contact with the terminals 24' and 25', one end of said spring-arm 21' being secured to an insulating-piece 26', and the other end is provided with a handpiece 27', whereby the contact with the terminal 24' may be broken and the circuit closed through the terminal 25'. One end of the coil 20' is connected by a wire 30' to the adjacent binding-post 1' of the main line, and the other end of the coil 20' is connected by a wire 31' to the spring-arm 21' through the medium of a binding-post 32'. The terminal 24 is connected by a wire 33' to the adjacent binding-post 1' of the main line, and the terminal 25' is connected by a wire 35' to one pole of the battery $b$, the other pole of said battery being connected by a wire 34' to the adjacent binding-post 1' on the main line.

It is evident from the foregoing description that the battery of each station is normally cut out from the main-line circuit and that the coil 20 and 20' of each station is normally connected in the main line.

In the operation of my invention suppose that the operator at station A desires to call the operator at station B, which may be hundreds of miles distant and under ordinary conditions would require a large battery or a great number of cells to carry sufficient current to operate the electric signal at the distant station. Now when it is desired to call said distant station the operator at station A depresses the key 27, thereby breaking the circuit between the contacts 22 and 24 and closing the circuit between the contacts 23 and 25. This connects the battery in the main-line circuit, the flow of the current being as follows: from one pole of the battery $a$ through wire 35, terminals 36 and 25, spring-conductor 21, wire 31, coil 20, wire 30 to binding-post 1 and thence out through the main-line wire L to the binding-post 1' at the distant station and then through wire 33', contacts 24' and 22', and spring-conductor 21', through the wire 31', coil 20' to the other binding-post 1' and thence outwardly through the returning-wire L' of the main line to the binding-post 1, wire 34, and back to the other pole of the battery. This completes the circuit through the main line and also through the coils 20 and 20', thereby deënergizing the magnets 9 and 9' and liberating the spring-terminals 2 and 2', which immediately close the local circuit through the contacts 3 and 4 and 3' and 4', thereby operating the signals $a'$ and $b'$. In like manner when the operator at station B desires to call the operator at station A the lever 27' is depressed, thereby closing the circuit from the battery through wire 35', spring-conductor 21', wire 31', coil 20', out through the main-line wire L', thence through the wire 33 of station A, through spring-conductor 21, wire 31, coil 20, wire 30, and returning over the main-line wire L and wire 34' to the other pole of the battery $b$, whereupon the same operation takes place in releasing the spring-arms 2 and 2' to close the local-battery circuit through the signals $a'$ and $b'$.

It is evident from the foregoing description that the electrical energy expended in operating the signal of a distant station is only what is required to deënergize the magnets 9 and 9', which energy is very slight, and this deënergizing of said magnets may be accomplished with a very weak current and as soon as the spring-terminals 2 and 2' are liberated, the local circuits in the stations carrying the full energy of the battery through their respective signals.

The operation of my invention will now be readily understood upon reference to the foregoing description and the accompanying drawing, and it will be noted that although any other similar electrical device may be operated in a similar manner without departing from the spirit of this invention.

Having thus described my invention, what I claim, and desire to secure by Letters Patent, is—

An electrical signaling device of the character described, comprising a main electrical circuit connecting two stations, local circuits and a source of electrical supply for said circuit arranged at each of said stations, signals in said local circuits, means for closing said circuit, connected with said signals, said circuit-closers comprising insulated supports, spring-arms mounted on said supports, adjustable means for regulating the tension of said spring members, said means being carried by the insulated means, electrically-actuated means adapted to normally hold apart said spring members, said means comprising permanent magnets adapted to attract the spring arms or members, coils disposed around said permanent magnets connected with the main circuit, switches connected with the main circuit and with the electrical source of supply for the local circuit whereby when the operation of said switches and magnets are deënergized to permit the contact of said spring members to close the local circuits, substantially as described.

In witness whereof I have hereunto set my hand this 5th day of August, 1902.

ULYSSES G. MERRILL.

Witnesses:
 THOMAS J. LYNCH,
 ANNIE WINTER.